July 15, 1952 — E. S. HANZEL — 2,603,370
AUTOMOBILE TOW TRUCK
Filed Jan. 28, 1950 — 2 SHEETS—SHEET 1
FIG_1
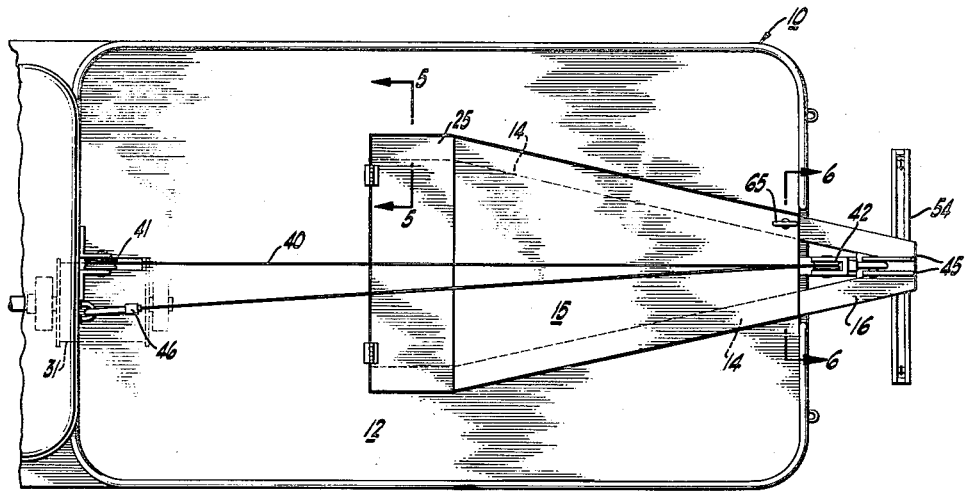
FIG_2
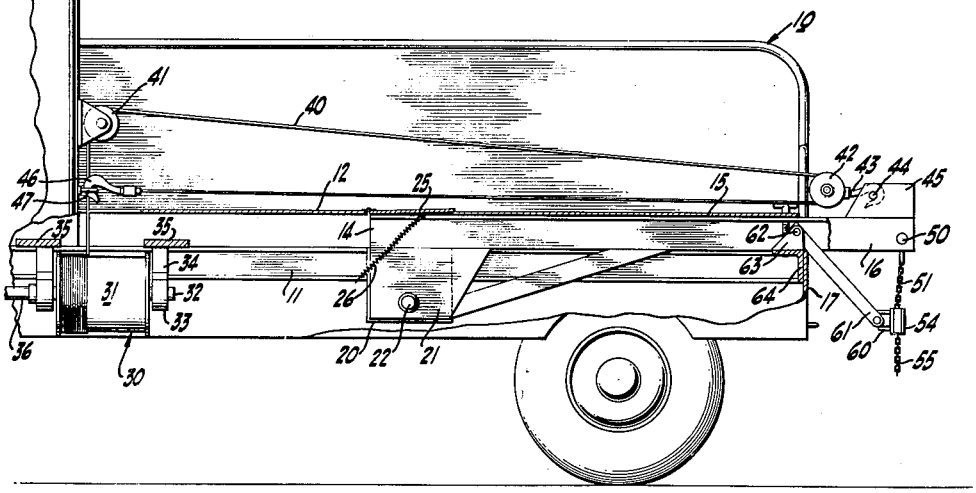
INVENTOR.
EDWARD S. HANZEL
BY
Mellin and Hanscom
ATTORNEY July 15, 1952     E. S. HANZEL     2,603,370
AUTOMOBILE TOW TRUCK
Filed Jan. 28, 1950     2 SHEETS—SHEET 2
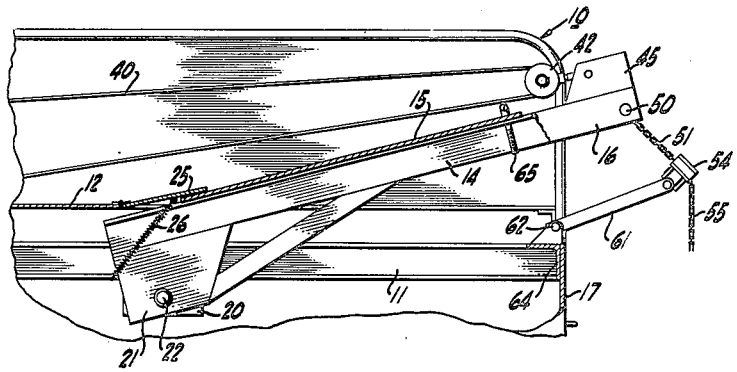
FIG_3
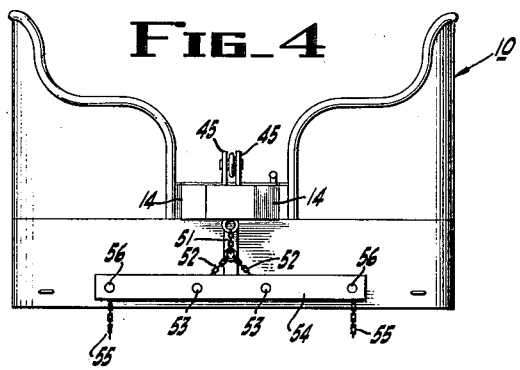
FIG_4
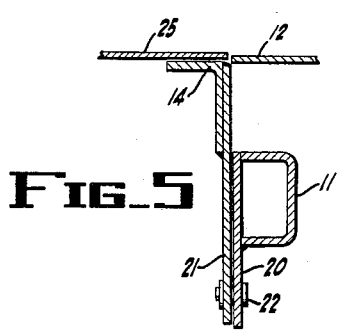
FIG_5
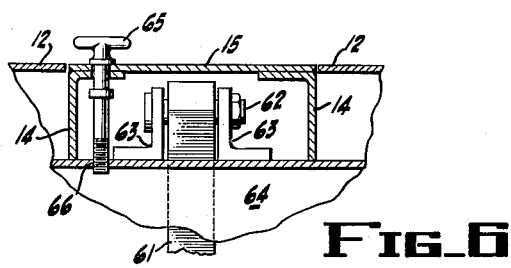
FIG_6
INVENTOR.
EDWARD S. HANZEL
BY
*Mellin and Hanson*
ATTORNEYS Patented July 15, 1952

2,603,370

UNITED STATES PATENT OFFICE 2,603,370

AUTOMOBILE TOW TRUCK

Edward S. Hanzel, San Leandro, Calif.

Application January 28, 1950, Serial No. 141,045

2 Claims. (Cl. 214—86)

This invention relates to automobile tow trucks and is particularly concerned with trucks which may be converted to use as normal pickup and delivery trucks when not employed in towing and wrecking operations.

It is among the primary objects of the present invention to provide a towing truck provided with a boom which may be readily moved to an out-of-the-way position, such as to clear the floor of the truck for the reception of freight and merchandise so that the truck may be utilized for normal trucking operations when the boom is not in use.

Another object of the present invention is to provide a winch assembly for a tow truck so mounted and arranged as to leave the floor of the truck body free for the reception of a load when the truck is not in use as a towing vehicle.

Another object of the present invention is to provide a new and improved wrecking truck having means thereon for lifting and towing other vehicles which means are so arranged as to provide for a division of the lifting and towing strains in such manner as to deliver such strains to the frame of the truck at a plurality of spaced points so as to avoid excessive strain at any one part on the vehicle.

Another object of the present invention is to provide a new and improved mounting for the spreader bar of a towing vehicle so as to minimize the danger of excessive free swinging of the spreader bar and consequently the danger of injury to the towing vehicle or the towed vehicle when the vehicles are in motion.

Numerous other objects and features of the present invention will be apparent from a consideration of the following specification taken in conjunction with the accompanying drawings, in which:

Fig. 1 is a top plan view of the body portion of a truck embodying the present invention.

Fig. 2 is a longitudinal sectional view of the truck body disclosed in Fig. 1.

Fig. 3 is a fragmentary detailed view similar to Fig. 2, showing the boom of the truck in elevated position.

Fig. 4 is a rear elevation of the truck with the boom in the position indicated in Figs. 1 and 2.

Fig. 5 is a detailed sectional view taken on the lines 5—5 of Fig. 1.

Fig. 6 is a detailed sectional view taken on the lines 6—6 of Fig. 1.

In general terms, the invention may be defined as comprising a truck, the floor of the body of which is recessed to provide for the reception of a pivotally mounted boom which in normal, inoperative position lies below the truck floor with its upper surface constituting a parallel continuation of the truck floor so that in such inoperative position the truck may be used as a conventional pickup and delivery truck. An important feature of the present invention is the pivotal mounting of the boom directly to the frame of the truck so that stresses and strains applied to the boom are delivered directly to the truck frame and are not applied to the body of the truck. Another feature of the present inporting a spreader bar from the boom and from the frame of the vehicle in such manner as to provide for a division of the stresses and strains provide for a division of the streses and strains applied to the spreader bar in lifting and towing another vehicle so that such concentration of such strains at any one point in the towing vehicle is avoided. Another feature of the present invention is the provision of a towing and lifting winch disposed below the body floor and so arranged as to act directly on the boom for lifting the boom from its inoperative position and to thereby lift a towed vehicle and also to provide for various uses of the winch in manners other than through connection with the boom of the truck.

Referring more particularly to the drawings, the body of the towing vehicle is indicated by the numeral 10 and is suitably supported in the usual manner upon longitudinal side channel rails 11 of the vehicle frame. As indicated at 12 the truck body includes a floor which is cut away as indicated in Figs. 1, 2, 5 and 6 to receive the pivotally mounted boom which comprises a pair of angularly disposed side rails 14 between which there extends a top plate 15. When the boom is in its lower inactive position below the floor 12 of the truck, the plate is parallel with the floor 12 and forms an extension thereof so as to provide a continuous flat unobstructed floor space. As will be noted at 16, the boom preferably extends beyond the vertical end wall 17 of the truck to overhang the rear end thereof.

Referring more particularly to Fig. 5 of the drawings, it will be noted that the pivotal mounting of the boom is provided by the securement of a pair of depending plates 20 to an intermediate position of the channel rails 11 of the truck frame and a pair of parallel plates 21 is secured to the side rails 14 of the boom. The plates 20 and 21 are pivotally joined by bolts 22 at a point substantially below the channel rails 11 of the truck frame so as to provide a low point of pivotal suspension for the boom below the center of gravity of the vehicle. By such suspension of the boom, it will be noted that the weight thereof and stresses and strains supplied thereto during lifting and pulling operations are delivered directly to the frame of the vehicle without imposing any such strains on the vehicle body. It will also be noted that such strains are divided and are received by the frame at opposite intermediate points thereof between the forward and rear points of the suspension of the frame by the wheels and spring carriage of the vehicle.

As will be noted more particularly in Figs. 2 and 3, the cover plate 15 of the boom terminates short of the inner transverse end of the boom opening in the floor 12 of the body so as to permit free pivotal movement of the boom. In order to continuously close the gap thus formed between the inner transverse ends of the plate 15 and the floor 12 there is provided a pivotally mounted closure plate 25 which is normally retained in horizontal position by a suitable spring as indicated at 26 in Fig. 2. By reference to Fig. 3, it will be seen that the plate 25 may move freely during the pivotal movement of the boom to maintain a closure between the boom and the floor of the truck at all times.

As indicated in Figs. 1 and 2 of the drawings, there is provided a winch generally indicated by the numeral 30 disposed below the floor 12 of the body for use in elevating the boom and also for various other types of wrecking, towing or like operations. The winch includes a conventional drum 31 suitably supported by trunnions 32 mounted in bearings 33 carried by hangers 34 depending from cross plates 35 extending between the side rails 11 of the frame. The drum may be rotated by a shaft 36 adapted to receive power in any suitable manner from the truck engine. However, it will be understood that the winch may be otherwise located and may be manually operated if desired. Thus, it will of course be understood that the present invention is not concerned with the specific structure or operation of the winch 30. Obviously various types of winches and various drives therefor may be substituted for the conventional type here depicted.

When in use, the cable 40 of the winch 30 may be arranged as indicated in Figs. 1 and 2 to extend through the floor 12 to a pulley 41 mounted on the truck cab and thence to a pulley 42, the hook 43 of which engages a cross bolt 44 mounted between the plates 45 at the outer extremity of the boom and from the pulley 42 the cable further extends in return manner to hook 46 engaging a ring 47 on the cab. With the cable 40 so arranged, it will be seen that as the drum 31 of the winch is revolved in order to wind in the cable, the boom will be pivotally moved and raised to the position indicated in Fig. 3 of the drawings. It will, of course, be understood that when the boom is not in operation, the hook 46 may be released and the pulley 42 removed from the end of the boom and the cable reeled onto the drum 31 to leave the entire floor space of the truck free for normal trucking operations.

The end of the boom is also provided with a cross bolt 50 from which there depends a lifting chain 51, preferably provided with an intermediate link from which extends a pair of sub-lifting chains 52 which engage the intermediate bolts 53 of a spreader bar 54. The ends of the spreader bar are also provided with a chain 55 carried by end bolts 56 which chain is adapted to be engaged in any suitable manner with the vehicle to be lifted and towed.

An important feature of the support of the spreader bar 54 is the provision of a universal joint 60 by which the spreader bar is secured to a pivotally mounted intermediate rigid link 61 which is pivotally connected by a bolt 62 supported between ears 63 carried by the transverse angle beam 64 of the truck frame. By this means of mounting the spreader bar, it will be noted that towing strains will be imparted to the boom through the chain 51 and thence to the side rails 11 of the truck frame through the pivotal mounting bolts 22 and also to the central portion of the end of the frame through the link 61, thus the towing strains will be divided and transmitted at widely spaced points in the frame so as to preclude an excessive strain at any one point in the frame.

When the boom is not in use, it may be secured against pivotal movement from its location below the floor of the vehicle body by a suitable bolt 65 which may be threaded into the end beam 64 of the vehicle frame as indicated at 66 in Fig. 6.

From the foregoing, it will be seen that the present invention provides a novel, simple and effective tow truck having a lifting and towing boom and a winch for raising the same and which provides for the inoperative position of the boom in a manner such as to leave the floor of the truck free for the usual trucking operations and provides for the disposal of the operating cable in such manner as not to interfere with such normal trucking operations. As noted above, it is an important feature of the invention to provide for the dispersion of the lifting and towing strains. Obviously, in connection with the invention as here shown, it is to be understood that the practice of the invention is not limited to the specific structural details disclosed and that numerous changes and modifications and the full use of equivalents may be resorted to without departure from the spirit and scope of the invention as outlined in the appended claims.

Having thus described my invention, what I claim and desire to obtain by Letters Patent is:

1. A tow truck comprising a frame having side rails and an end rail, a body supported by said frame having a floor with an opening therein, a boom pivotally secured to said side rails intermediate their ends and movable through the opening of the floor, means on said boom forming a continuation of the floor over said opening when the boom is in lowermost position, a winch and cable for pivotally moving said boom carried by said frame and disposed below said floor, and a spreader bar carried by the boom and pivotally engaging said end rail for lifting a vehicle.

2. The structure as set forth in claim 1 in which the boom extends beyond the end rail of the frame and is releasably secured thereto when the boom is in lowermost position.

EDWARD S. HANZEL.

REFERENCES CITED

The following references are of record in the file of this patent:

UNITED STATES PATENTS

| Number | Name | Date |
| --- | --- | --- |
| 1,657,655 | Ashton | Jan. 31, 1928 |
| 2,145,378 | Trippensee | Jan. 31, 1939 |
| 2,283,443 | Klein | May 19, 1942 |
| 2,497,379 | Vandergrift, et al. | Feb. 14, 1950 |
| 2,509,435 | Huttinger | May 30, 1950 |

FOREIGN PATENTS

| Number | Country | Date |
| --- | --- | --- |
| 385,467 | Great Britain | Dec. 29, 1932 |